Patented Oct. 4, 1949

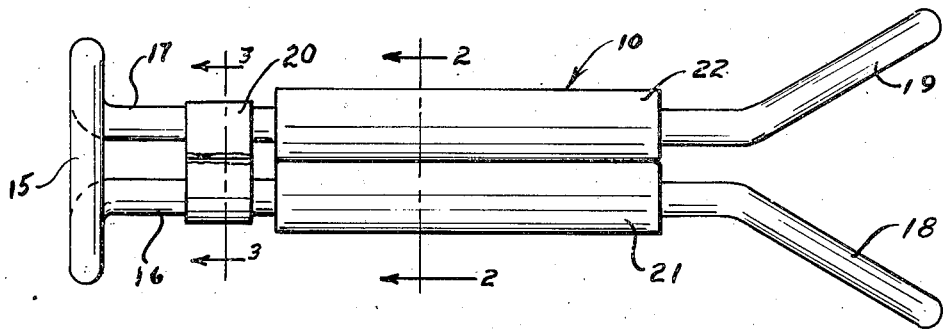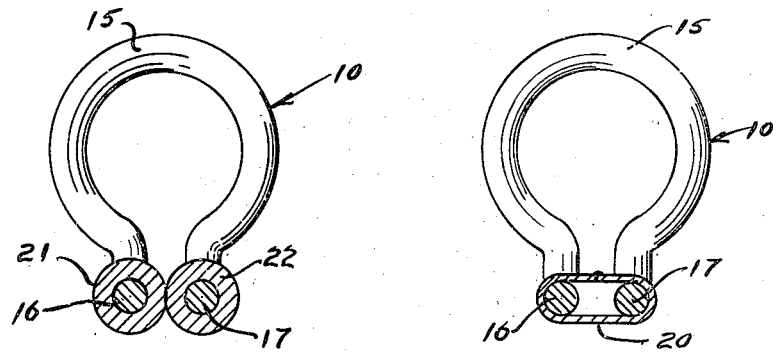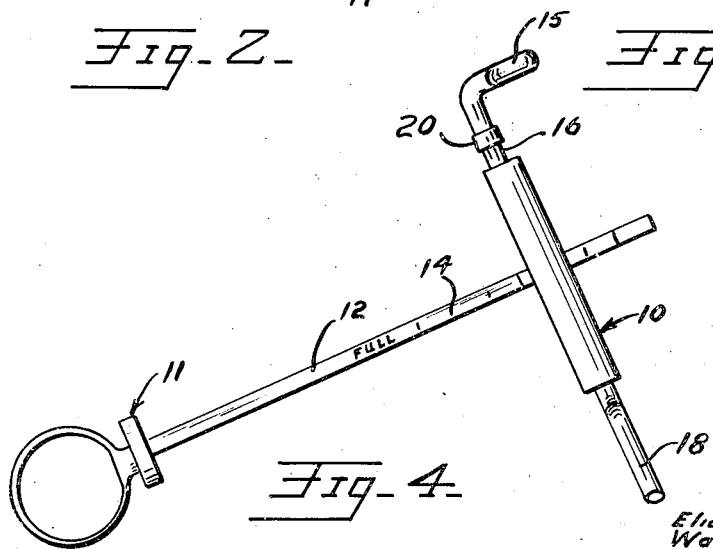

2,483,536

UNITED STATES PATENT OFFICE 2,483,536

CRANKCASE OIL GAUGE WIPER

Elias U. Gamble and Wayne C. Gamble, Colton, Calif.

Application July 19, 1946, Serial No. 684,866

1 Claim. (Cl. 15—210)

This invention relates to a wiper for oil gauge rods.

An object of this invention is to provide a wiper for the oil quantity indicating gauge rod which is carried by the crankcase of automobile engines.

Another object of this invention is to provide a wiper of this kind which may be readily manufactured by bending a strip or rod of substantially resilient material upon itself to provide a pair of parallel arms and an absorbent material on each of the arms between which the gauge rod may be drawn for removing the oil and dirt therefrom after which the rod may be reinserted into the crankcase for determining the quantity and quality of the oil therein.

Another object of this invention is to provide an engine crankcase oil gauge rod wiper which is formed of a length of wire bent upon itself having a loop on one end which may readily be attached to the engine crankcase or on the forward side of the engine wall under the hood or any other suitable and convenient place in the car.

Still another object of this invention is to provide an engine gauge rod wiper of this kind having a pair of sleeves made of suitable absorbent material through which the rod may be drawn and which sleeves may readily be removed and replaced when they become dirty and saturated.

With the above and other objects in view, our invention consists in the arrangement, combination and details of construction disclosed in the drawings and specification, and then more particularly pointed out in the appended claim.

In the drawings,

Figure 1 is a top plan view of this wiper,

Figure 2 is a vertical section taken on the line 2—2 of Figure 1,

Figure 3 is a vertical section taken on the line 3—3 of Figure 1,

Figure 4 is a side elevation of the wiper as used on an oil gauge rod.

Referring to the drawings, the numeral 10 designates generally a crankcase oil gauge rod wiper constructed according to an embodiment of our invention.

Frequently motorists have had occasion to check the oil in the crankcase of the engine, and have been without suitable means for wiping the rod clean to check for the quantity and quality of the oil. In service stations where the oil of many engines is checked daily, the attendants use any dirty or oily rags for wiping the rod and frequently some delay is occasioned while the attendant searches for such a suitable rag or other material.

As in all cases, to check the oil, the gauge rod must be first withdrawn from the crankcase, wiped clean, reinserted and again withdrawn to show or indicate the quantity and quality of the oil in the crankcase. It would be much more convenient to provide a wiper for cleaning the rod which might be readily and accessibly carried in the engine compartment of the car, and which may be stored at a convenient location in a service station, thereby providing an always ready wiper for such rods, and, especially at service stations, it would be most desirable to have such a wiper which could be provided with a readily replaceable absorbent element. Such a wiper, since it is used for a generally considered minor operation, must necessarily be simple and efficient to be sold at a very low price, or even handed out as an advertising device. Such a device is provided by a wiper constructed according to an embodiment of this invention.

An oil gauge indicating rod is designated generally by the numeral 11 and is provided with an elongated flat blade 12, having indicia 14 inscribed along the length thereof for indicating the level of the oil in the crankcase.

The wiper 10 which is provided for wiping the oil and dirt from the blade 12, is formed of an elongated metal rod bent upon itself to form a symmetrical body or device. The rod is formed with a substantially arcuate loop 15 at one end of the wiper 10, and a pair of parallel arms 16, 17 extending forwardly from the loop 15 in a plane perpendicular to the plane of the loop 15 in such a manner that the arms 16, 17 provide a body for the wiper 10. The arms 16, 17 are bent at their forward or outer ends outwardly at an acute angle to provide a pair of outwardly divergent ends 18, 19 respectively, to facilitate the insertion of the rod 11 between the arms 16, 17.

A looped strap or clamp 20 is formed of a flat length of metal bent around the arms 16, 17, at their inner ends adjacent the loop 15, for securely positioning and holding the arms 16, 17 in spaced apart relation at their inner ends, whereby the inner ends of the arms 16, 17 are held against separation.

For wiping the blade 12 clean of oil and dirt, there are provided a pair of cylindrical or tubular members 21, 22, which are adapted to be carried by the arms 16, 17 respectively, along the length of the arms 16, 17, the sleeves 21 and 22 resiliently engaging each other along their adjacent edges as shown in Figures 1 and 2. The sleeves 21, 22 may be made of soft cloth or soft paper or any other suitable soft absorbent material, and are adapted to be slidable on their respective arms 16, 17, for removal when they become dirty or saturated with oil.

In the use of this crankcase oil gauge rod wiper, the sleeves 21, 22 may be slid onto the arms 16, 17 by sliding up the ends 18, 19 and by holding the arms 16, 17 apart while the sleeves 21, 22 are correctly positioned. The rod blade 12 may readily be inserted between the ends 18, 19 and slipped between the sleeves 21, 22 longitudinally of the rod 11 for removing the dirt and oil.

We do not mean to confine ourselves to the exact details of construction herein disclosed, but claim all variations falling within the purview of the appended claim.

What we claim is:

An oil gauge rod wiper comprising a length of substantially resilient wire bent upon itself to form a loop intermediate the length of wire and constituting a supporting hook, a pair of parallel arms perpendicular to the plane of said loop and extending forwardly therefrom, a clamping strap engaging about said arms adjacent said loop, wiping elements slidable and rotatable on said arms, and outwardly divergent terminal ends on said arms restraining said elements from inadvertent sliding movement therefrom.

ELIAS U. GAMBLE.
WAYNE C. GAMBLE.

REFERENCES CITED

The following references are of record in the file of this patent:

UNITED STATES PATENTS

| Number | Name | Date |
|---|---|---|
| D. 88,653 | Hudson | Dec. 13, 1932 |
| 1,261,688 | Bratherton | Apr. 2, 1918 |
| 1,289,325 | Wake | Dec. 31, 1918 |
| 1,771,164 | Crompton | July 22, 1930 |
| 1,922,450 | O'Brien | Aug. 15, 1933 |
| 1,962,675 | Zentmyer | June 12, 1934 |
| 2,329,757 | Greenfield | Sept. 21, 1943 |

FOREIGN PATENTS

| Number | Country | Date |
|---|---|---|
| 267,694 | Great Britain | Mar. 24, 1927 |
| 345,563 | Canada | Oct. 30, 1934 |